United States Patent [19]

Doe et al.

[11] Patent Number: 5,883,951
[45] Date of Patent: Mar. 16, 1999

[54] METHOD AND ARRANGEMENT FOR UNTRAPPING AN UNSUCCESSFUL CALL

[75] Inventors: Stephen Richard Doe; Jan-Olof Mannby, both of East Sussex, United Kingdom

[73] Assignee: Telefonaktiebolaget LM Ericsson, Stockholm, Sweden

[21] Appl. No.: 803,132

[22] Filed: Feb. 18, 1997

[30] Foreign Application Priority Data

Feb. 19, 1996 [GB] United Kingdom .................. 9603453

[51] Int. Cl.⁶ ....................................................... H04M 3/42
[52] U.S. Cl. ........................... 379/229; 379/207; 379/219
[58] Field of Search .................................. 379/211, 229, 379/265, 201, 207, 219, 230

[56] References Cited

U.S. PATENT DOCUMENTS

| | | | |
|---|---|---|---|
| 4,446,337 | 5/1984 | Cofer | 179/118 |
| 4,809,321 | 2/1989 | Morganstein et al. | 379/211 |
| 4,910,762 | 3/1990 | Blom | 379/67 |
| 5,249,219 | 9/1993 | Morganstein et al. | 379/84 |
| 5,329,578 | 7/1994 | Brennan et al. | 379/211 |
| 5,422,945 | 6/1995 | Wyatt | 379/283 |
| 5,438,570 | 8/1995 | Karras et al. | 379/133 |
| 5,463,677 | 10/1995 | Bash et al. | 379/88 |
| 5,592,530 | 1/1997 | Brockman et al. | 379/34 |
| 5,793,839 | 8/1998 | Farris et al. | 379/34 |

FOREIGN PATENT DOCUMENTS

| | | | |
|---|---|---|---|
| 0 485 980 | 5/1992 | European Pat. Off. | H04M 3/50 |
| 0 485 980 A2 | 5/1992 | European Pat. Off. | |
| 0 487 811 | 6/1992 | European Pat. Off. | H04Q 11/04 |
| 0 493 991 | 7/1992 | European Pat. Off. | H04M 3/54 |
| 0 493 991 A1 | 8/1992 | European Pat. Off. | |
| 0 604 041 | 6/1994 | European Pat. Off. | H04M 3/54 |
| 0 608 613 | 8/1994 | European Pat. Off. | H04Q 3/47 |
| 0 641 112 | 3/1995 | European Pat. Off. | H04M 3/50 |
| 0 663 753 | 7/1995 | European Pat. Off. | H04M 3/50 |
| 2 283 880 | 5/1995 | United Kingdom | H04M 3/50 |
| WO93/15582 | 8/1993 | WIPO | H04M 3/42 |

*Primary Examiner*—Scott Wolinsky
*Attorney, Agent, or Firm*—Burns, Doane, Swecker & Mathis, L.L.P.

[57] ABSTRACT

A method and apparatus for allowing a calling subscriber, who sent a call request including an address in an attempt to place a call to a called subscriber, to untrap an unsuccessful call due to the called subscriber being busy or unreachable. In a first procedure, before completion of the call is attempted, it is determined from the address included in the call request whether the network to which the call is directed is one which traps calls. If so, the calling subscriber is informed on how to untrap the call should the call be unsuccessful. In a second procedure, a determination is made as to whether a call is unsuccessful, if the time period between receiving an Address Complete Message (ACM) and an Answer Message (ANM) from a network that traps calls is less than a very short predetermined threshold (e.g., 0.5 seconds), indicating that the call could not have been answered by a human subscriber.

4 Claims, 2 Drawing Sheets

METHOD AND ARRANGEMENT FOR UNTRAPPING AN UNSUCCESSFUL CALL

TECHNICAL FIELD OF THE INVENTION

This invention relates to a method and arrangement for handling telephone calls, and in particular to a method and arrangement for regaining control of telephone calls which might otherwise be trapped by the networks to which they are sent.

DESCRIPTION OF RELATED ART

For a telecommunications network operator to be able to provide a flexible universal personal telephony service (UPT) or personal numbering service (PN), where the subscriber may be registered on a terminal in any network, including networks not belonging to the operator, a mechanism is needed which allows calls to be redirected to an alternative destination. Conventionally, this is based on information received in the network signalling, indicating that the subscriber is busy, or that the terminal cannot be reached.

However, it is the policy of some networks to trap calls. Thus, even when the called party is busy, or otherwise not reachable, the network completes the call set-up signalling sequence, for example by playing an announcement or connecting to a mailbox. This means that the call appears always to be successful from the point of view of an operator of another network. As a result, the conventional mechanism, relying on network signalling, for detecting an unsuccessful call attempt, is not sufficient, and an alternative mechanism is necessary.

EP-A-0485980 discloses a system in which, when a calling subscriber calls a called subscriber, an exchange, in response to a request provided in advance by the called subscriber, connects the calling subscriber to a message storing unit, and, in response to a request made by the calling subscriber in response to the stored message, either stores a message from the calling subscriber or transfers the calling subscriber to an alternative terminal.

EP-A-0493991 discloses a system in which there is means for discriminating whether it is possible to transfer a held call from a first terminal to a transfer destination and, if communication with the transfer destination is impossible, releasing the holding state of the call.

SUMMARY OF THE INVENTION

It is an object of the invention to allow a calling subscriber, or the network from which the calling subscriber is calling, to regain control of calls which may be trapped.

According to a first aspect of the invention, it is detected by the calling network in advance whether the called network is one which traps calls. If so, the calling subscriber is informed before the call is attempted that, if the call is unsuccessful, he can at any stage enter a specific digit or digit sequence to untrap the call.

According to a second aspect of the invention, the calling network analyzes the network signalling received from the called network and, if it is detected that the call is terminated very quickly, more quickly than a human is likely to respond, it is determined that the call has in fact terminated unsuccessfully.

As a result, it is possible to avoid trapping of calls, and thus to allow calls to be redirected if desired.

DETAILED DESCRIPTION OF PREFERRED EMBODIMENTS

Figure 1:
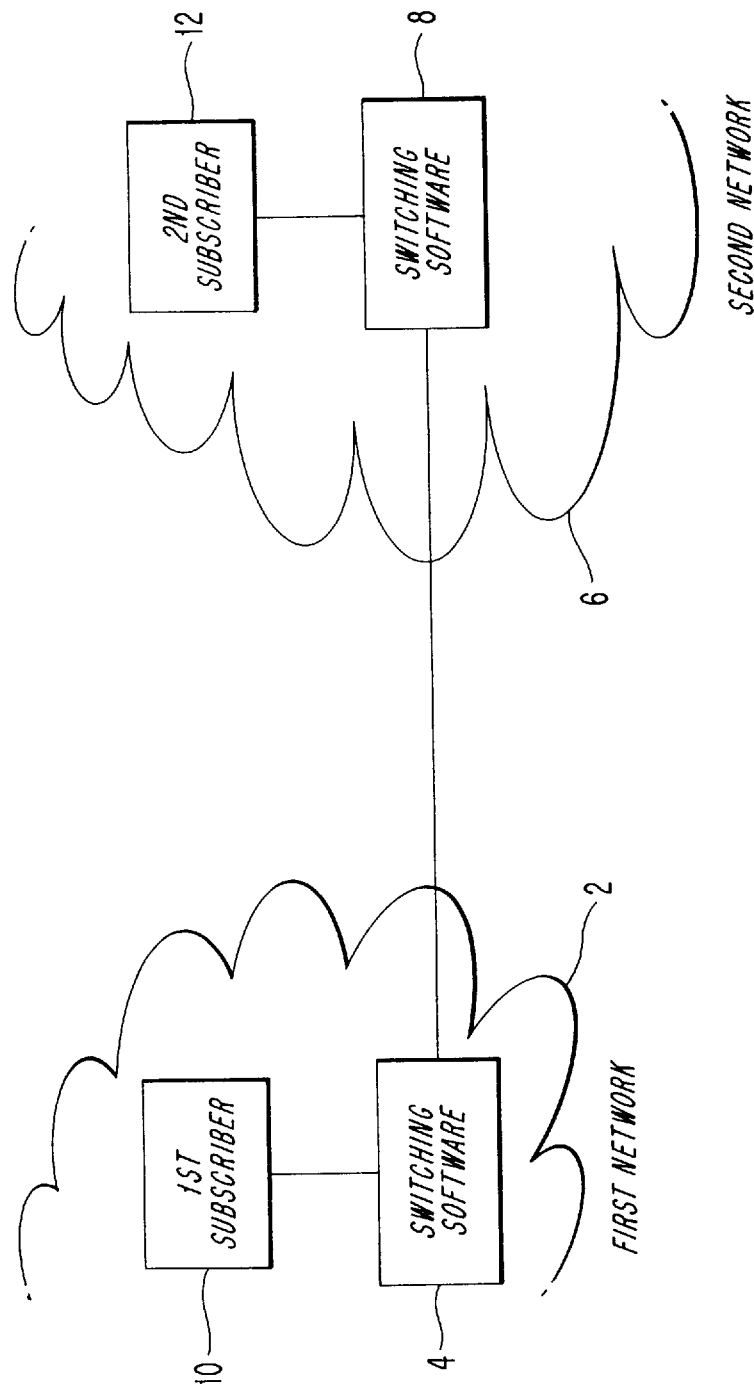
FIG. 1 is a schematic illustration of a connection between two telephone networks.

FIG. 1 schematically illustrates a first network 2, having switching software 4, and a second network 6, having switching software 8. The invention will be described herein with reference to a first subscriber 10, connected to the first network 2, attempting to place a call to a second subscriber 12, connected to the second network 6.

Figure 2:
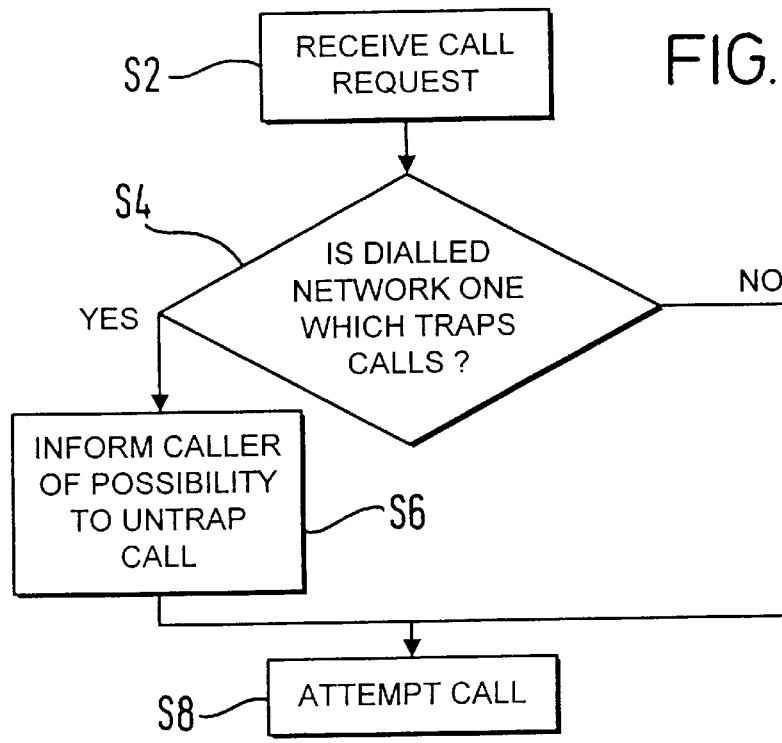
FIG. 2 is a flow chart illustrating a procedure carried out by a network in accordance with a first aspect of the invention.

FIG. 2 illustrates a first process by which the calling network can attempt to ensure that a call is not trapped if unsuccessful. In step S2, the network switching software 4 receives a call request from the calling subscriber 10. A requested destination number included in the call request is then analyzed in step S4, to identify the network to which it belongs. If this network is known to be a network which traps calls, the process proceeds to step S6, and the calling subscriber is informed that, if the call is not completed successfully for any reason, he has the opportunity to untrap the call by entering a particular digit, or a digit sequence (assuming that he is using a DTMF phone) at any time. For example, the caller may be able to untrap the call by transferring the call to another destination, such as a voice-mail system. The specific digit or digits which must be entered can be chosen at the design stage, such that there is no interference with any other service features. Once this message has been given, or in the situation that step S4 determines that the network to be called is not one which traps calls, the process proceeds to step S8, in which the call is attempted.

Thus, if the network is one which traps calls, the calling subscriber is given the opportunity to untrap the call, for example by leaving a message for the called subscriber on a voice-mail system, at any time.

Figure 3:
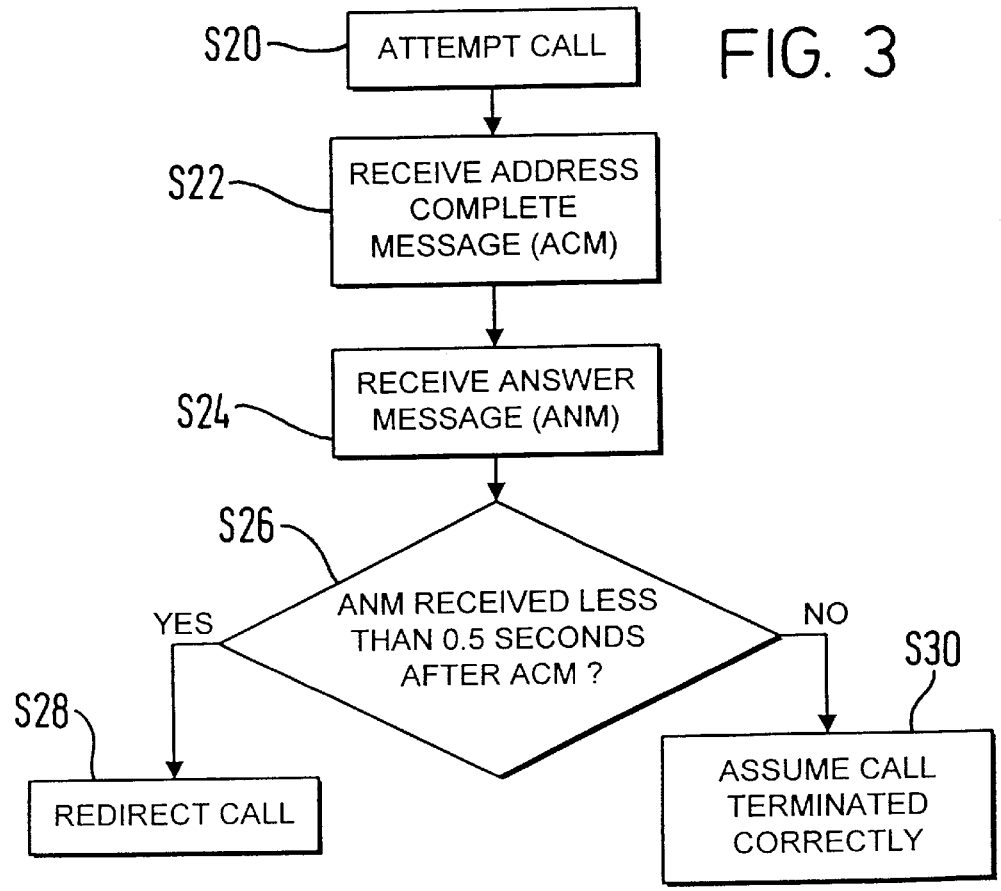
FIG. 3 is a flow chart illustrating a procedure carried out by a network in accordance with a second aspect of the invention.

FIG. 3 illustrates a second procedure, which may be carried out by the calling network switching software 4. On receipt of a call request from the calling subscriber 10, the call is attempted to the called subscriber 12 through the switching software 8 of the second network 6 in step S20. In step S22, the switching software 4 receives from the switching software 8 an Address Complete Message (ACM), indicating that the switching software 8 has received the address to which the call is intended to be placed. If the call can be placed successfully, it is passed to the second subscriber 12 and, when the called subscriber answers, an Answer Message (ANM) will be sent from the network switching software 8 to the network switching software 4, and received in step S24. However, if the called subscriber 12 is busy, or otherwise not reachable, the switching software 8 will not place the call to the second subscriber 12, but, if it is in a network which traps calls, it will instead send its own Answer Message (ANM), followed for example either by an announcement trapping the call, or by a connection to a mailbox. In such a case, the Answer Message will be received by the switching software 4 very shortly after receipt of the Address Complete Message.

Therefore, the switching software 4 implements a timing mechanism, and, in step S26, determines whether the time interval between receipt of the Address Complete Message and the Answer Message is less than, for example, 0.5 seconds. It is determined that, if the time interval is less than this threshold, it is extremely unlikely that the call could have been answered by a human subscriber, and hence the Answer Message is interpreted as a signal indicating that the called subscriber is busy or not reachable. As a result, in step S28, the call can be redirected. On the other hand, if the time interval is determined in step S26 to be equal to or greater than 0.5 seconds, it is assumed in step S30 that the call has terminated correctly.

There are therefore provided arrangements which allow the calling network to regain control of calls which might otherwise be trapped.

We claim:

1. A method of handling a telephone call in a network switching device, comprising:

receiving a call request from a caller attempting to place call;

analyzing an address included in the call request to determine whether a network to which the call is to be directed is one which traps calls; and if the network traps calls, informing the caller as to how the caller can untrap the call if the call is not successful.

2. A network switching device, comprising:

means for analyzing an address included in a call request received from a caller attempting to place a call, to determine whether a network, to which the call is to be directed, is one which traps calls; and means for informing the callers if the network traps calls, as to how the caller can untrap the call if the call is unsuccessful.

3. A method of handling a telephone call in a network switching device, comprising:

receiving a first message from a called network that traps calls indicating that an address to which a call is to be completed has been received;

receiving a second message from the called network indicating that the call has been answered;

analyzing the time interval between receipt of the first and second messages; and determining, if the time interval is less than a predetermined threshold, that the call was unsuccessful.

4. A network switching device, comprising:

means for receiving a first message from a called network that traps calls, indicating that an address to which a call is to be completed has been received;

means for receiving a second message from the called network, indicating that the call has been answered;

means for comparing the time interval between receipt of the first and second messages with a predetermined threshold; and means for determining, if the time interval is less than the threshold, that the call was unsuccessful.

* * * * *